(12) United States Patent
Wu

(10) Patent No.: US 7,430,202 B2
(45) Date of Patent: Sep. 30, 2008

(54) SYSTEM AND METHOD OF TRIBUTARY TIME-SPACE SWITCHING

(75) Inventor: Ephrem Wu, San Mateo, CA (US)

(73) Assignee: LSI Corporation, Milpitas, CA (US)

( * ) Notice: Subject to any disclaimer, the term of this patent is extended or adjusted under 35 U.S.C. 154(b) by 814 days.

(21) Appl. No.: 10/802,114

(22) Filed: Mar. 15, 2004

(65) Prior Publication Data

US 2005/0030943 A1 Feb. 10, 2005

Related U.S. Application Data

(60) Provisional application No. 60/492,837, filed on Aug. 6, 2003.

(51) Int. Cl.
  *H04L 12/50* (2006.01)
  *H04Q 11/00* (2006.01)
  *G06F 9/34* (2006.01)
  *G06F 9/26* (2006.01)
  *G06F 12/00* (2006.01)

(52) U.S. Cl. .......................... 370/375; 370/60; 711/209

(58) Field of Classification Search ................ 370/375, 370/369, 442, 395.71, 360, 357; 711/209
  See application file for complete search history.

(56) References Cited

U.S. PATENT DOCUMENTS 4,998,242 A * 3/1991 Upp ........................... 370/392
5,914,952 A * 6/1999 Eom et al. ................... 370/369
6,421,770 B1 * 7/2002 Huch et al. .................. 711/209
6,650,637 B1 * 11/2003 Bansal et al. ................ 370/360
7,075,938 B1 * 7/2006 Takada et al. ........... 370/395.71

OTHER PUBLICATIONS

Ultra High Speed Packet Buffering Using "Parallel Packet buffer", Sailesh Kumar, Raja Venkatesh, Joji Philip, Sunil Shukla, Proceeding of IEEE International Conference on Neworking (ICN 2002), Aug. 21, 2002.*

* cited by examiner

*Primary Examiner*—Huy D. Vu
*Assistant Examiner*—David Oveissi
(74) *Attorney, Agent, or Firm*—Christopher P. Maiorana PC

(57) ABSTRACT

A tributary time-space switch and a method of switching are provided having low memory requirements. The switch includes a number of inputs and outputs. Each of the inputs receives an input data stream carrying tributary payloads from an external input link that are capable of being individually switched in space and time. A write controller causes input columns of the input data stream to be written to a common buffer according to a write pointer. In parallel, a read controller causes the input columns to be read from the common buffer to output columns of an output data stream according to a read pointer. For each of the output columns, the read pointer selects an input column from a limited portion of the buffer that contains a set of the input columns that are capable of being switched in time to the corresponding output column according to a communication protocol.

29 Claims, 6 Drawing Sheets

SYSTEM AND METHOD OF TRIBUTARY TIME-SPACE SWITCHING

RELATED APPLICATION

This application claims the benefit of U.S. Provisional Application No. 60/492,837, filed Aug. 6, 2003. The entire teachings of the above application are incorporated herein by reference.

BACKGROUND OF THE INVENTION

Transport network standards such as Synchronous Optical Network (SONET) and Synchronous Digital Hierarchy (SDH) are well known in the art for transporting data in communication networks.

The lowest bandwidth, or most granular, "high-order" switching unit of a SONET frame is the STS-1 frame. FIG. 1 is a diagram illustrating an STS-1 frame according to the SONET standard. Each STS-1 frame 100 comprises nine 90-column rows, or 9×90=810 bytes, transmitted in 125 µs. In other words, the frame rate is 51.84 Mbps. The first three columns in the 90-column STS-1 frame are the transport overhead (TOH) columns 102. Each STS-1 frame 100 carries a payload in the synchronous payload envelope (SPE) 104, which in turns carries "low-order" switching units. In SONET, there are four such low-order switching units, known as virtual tributaries. The following table summarizes the frame sizes and rates for these virtual tributaries.

| Virtual Tributary | Format | | Frame Rate (Mbps) |
|---|---|---|---|
| | Number of Rows | Number of Columns | |
| VT1.5 | 9 | 3 | 1.728 |
| VT2 | 9 | 4 | 2.304 |
| VT3 | 9 | 6 | 3.456 |
| VT6 | 9 | 12 | 6.912 |

Being able to cost-effectively manage bandwidth at the VT level is more advantageous to service providers than at the less granular STS-1 level. For instance, Digital Subscriber Loop (DSL) traffic up to the T1 rate can be mapped onto one VT1.5 tributary and carried inside an STS-1 payload. An STS-1 payload can carry up to 28 VT1.5 tributaries at once. Thus, an STS-1 payload can carry up to 28 DSL connections. Likewise, a 10BaseT Ethernet connection can be mapped onto 7 VT1.5 tributaries, enabling an STS-1 frame to carry up to 4 Ethernet connections. With VT level bandwidth management, the available bandwidth is more efficiently utilized.

FIG. 2 is a diagram illustrating an exemplary tributary time-space switch according to the prior art. The switch 200 grooms traffic from P STS-N input streams to Q STS-N output streams with column granularity in an unrestricted non-blocking fashion. In other words, the time-space switch can connect any available output column to any input column in both space and time.

The time-space switch comprises a switch core 201, a connection map 204, and a controller 205. The switch core 201 comprises two identical buffers, 202 and 203, each capable of storing P rows of STS-N data, or 90PN bytes. Each buffer alternates between being a read buffer and a write buffer for 90N byte cycles such that one buffer is the read buffer while the other is the write buffer.

To achieve the time-space switching function, data is written from the current frame row into the write buffer sequentially according to the write address 208 that is generated by the controller 205. As data from the current row fills the write buffer, data from the previous frame row is read from the read buffer according to the order specified in the connection map 204. The connection map 204 generates the read addresses 209 in response to being indexed by the output column counter 210 from the controller 205.

The switch core 201, which has P input ports and Q output ports, logically has one write port of 8P bits wide 206 and Q read ports of 8 bits wide 207. Physical implementation may limit the number of read ports of each switch core memory module to have fewer than Q read ports, (e.g., K read ports), in which case M=[Q/K] copies of the K-read-port-one-write-port switch core modules are necessary to implement Q read ports for the switch core. Such a switch core requires P×N×M×90×8×2=1440 PNM bits. For instance, an 80 Gbps SONET tributary time-space switch having P=32 STS-48 (N=48) input ports requires 1440PNM=2,211,840M bits for the switch core.

SUMMARY OF THE INVENTION

While the column switch in FIG. 2 is conceptually simple, it provides flexibility that tributary time-space switching does not require, namely the ability to switch any input column to any output column. In SONET, for example, virtual tributaries are comprised of columns that are interleaved in time such that the temporal ordering of the columns within each tributary is fixed. A tributary time-space switch must also not alter the temporal ordering of the tributary columns. For example, the switch must maintain the temporal ordering of the four columns within a particular VT2 tributary. Based on this restriction, the SONET standard does not allow any input column to be connected to just any output column. Instead, each input column is capable of being switched to only a subset of output columns. Thus, prior art techniques that store an entire row of a frame in one page of the switch core before letting the controller read the data out are unnecessary.

The present invention provides a tributary time-space switch and a method of switching that exploit the necessary tributary switching patterns to lower the memory requirements of the switch core.

The switch includes a number of inputs and outputs. Each of the inputs receives an input data stream carrying tributary payloads from an external input link that are capable of being individually switched in space and time. A write controller causes input columns of the input data stream to be written to a common buffer according to a write pointer. A read controller, in parallel with the write controller, causes the input columns to be read from the common buffer to output columns of an output data stream according to a read pointer. For each of the output columns, the read pointer selects an input column from a limited portion of the buffer that contains a set of the input columns that are capable of being switched in time to the corresponding output column according to a communication protocol. Because only a limited portion of the buffer is available to be read for a corresponding output column, separate read and write buffers are unnecessary.

In particular embodiments, the communication protocol can be SONET. Each of the tributary payloads can be characterized by an arbitrary type or a same type. For example, in SONET, the types can include VT1.5, VT2, VT3 and VT6. The limited portion of the buffer preferably depends on a corresponding location of the write pointer in the buffer, such that for each output column the corresponding location of the write pointer and the limited portion containing the set of input columns for reading are mutually exclusive.

In particular embodiments, each of the tributary payloads includes an ordered set of input columns that are interleaved within a payload of the input data stream. The read controller, in parallel with write controller, causes the input columns from the common buffer to be read to the output columns of the output data stream according to the read pointer. For each of the output columns, the read pointer selects an input column from a limited portion of the common buffer that contains a set of the input columns that are capable of being switched in time to the corresponding output column and maintain the order of the input columns within each of the tributary payloads.

According to one particular embodiment, the input data stream is a frame having columns and rows and the common buffer has a length substantially equal to a frame row. For example, the frame can be an STS-N frame and the buffer has a length substantially equal to 90N bytes. The write controller causes the input columns of the frame row to be written into the common buffer sequentially from a beginning location to an end location of the buffer according to the write pointer. The read controller, in parallel with the write controller, causes the input columns from the common buffer to be read to the output columns of the output data stream. For each of the output columns, the read pointer selects an input column from a limited portion of the common buffer that contains a set of the input columns that are capable of being switched in time to the corresponding output column and maintain the order of the input columns within each of the plural tributary payloads. The limited portion can be a continuous range of buffer locations that depends on a corresponding location of the write pointer in the buffer.

According to another particular embodiment, the input data stream is a frame having columns and rows and the common buffer has a length less than a frame row. For example, the frame can be an STS-N frame and the buffer has a length substantially equal to 62N bytes. The write controller causes a first set of the input columns of the frame row to be written into the common buffer sequentially from a beginning location to an end location of the buffer. The write controller further causes a second set of the input columns of the frame row to be written sequentially from an intermediate location to an end location of the buffer. The read controller, in parallel with the write controller, causes the input columns from the common buffer to be read to the output columns of the output data stream. For each of the output columns, the read pointer selects an input column from a limited portion of the common buffer that contains a set of the input columns that are capable of being switched in time to the corresponding output column and maintain the order of the input columns within each of the plural tributary payloads. The limited portion can include buffer locations that depend on a corresponding location of the write pointer in the buffer and whether the first set or the second set of the input data units is being written.

According to other particular embodiments, the limited portion can also be an arbitrary set of buffer locations such that during any time slot the read controller can select any byte from the set to correctly switch the byte to the output and the buffer write pointer does not point to any buffer location in the set.

Embodiments of the invention preferably switch any mix of virtual tributaries regardless of size and/or formats in an unrestricted non-blocking fashion without requiring the incoming data be translated prior to entering the switch core. However, embodiments of the invention can also be applied to switches that translate incoming data by converting one tributary format into another prior to switching. For instance, the system might convert a VT1.5 tributary into a VT2 tribuary by stuffing the VT1.5 tributary and passing the resulting VT2 tributary to the switch.

Embodiments of the invention are also capable of performing unrestricted multicast, which is generally an important attribute for a tributary time-space switches that handle data-oriented application services such as video conferencing.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

The present invention provides a system and method for tributary time-space switching that reduces the memory requirements of the switch core typically associated with prior art tributary time-space switches. In particular, the switch core can be implemented with a single common buffer for reading and writing in parallel. Input columns of an input data stream are written to the buffer according to a write pointer, while, for each of the output columns, a read pointer selects an input column from a limited portion of the buffer that contains a set of the input columns that are capable of being switched in time to the corresponding output column according to a communication protocol. The limited buffer portion preferably depends on a corresponding location of the write pointer and does not include the location of the write pointer in the buffer.

For purposes of example, the following description refers to the SONET transport network standard. However, embodiments of the invention may also be applied to the SDH transport network standard and other standards known to those skilled in the art.

Figure 1:
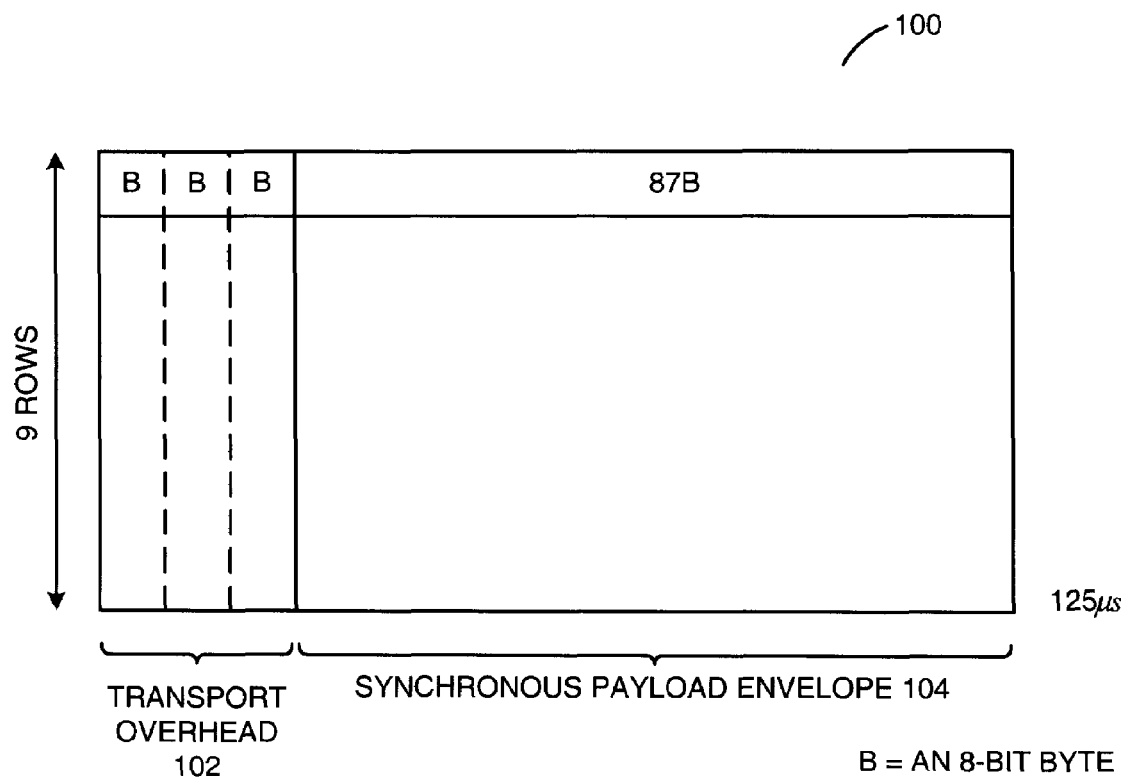
FIG. 1 is a diagram illustrating an STS-1 frame according to the SONET standard.
Figure 2:
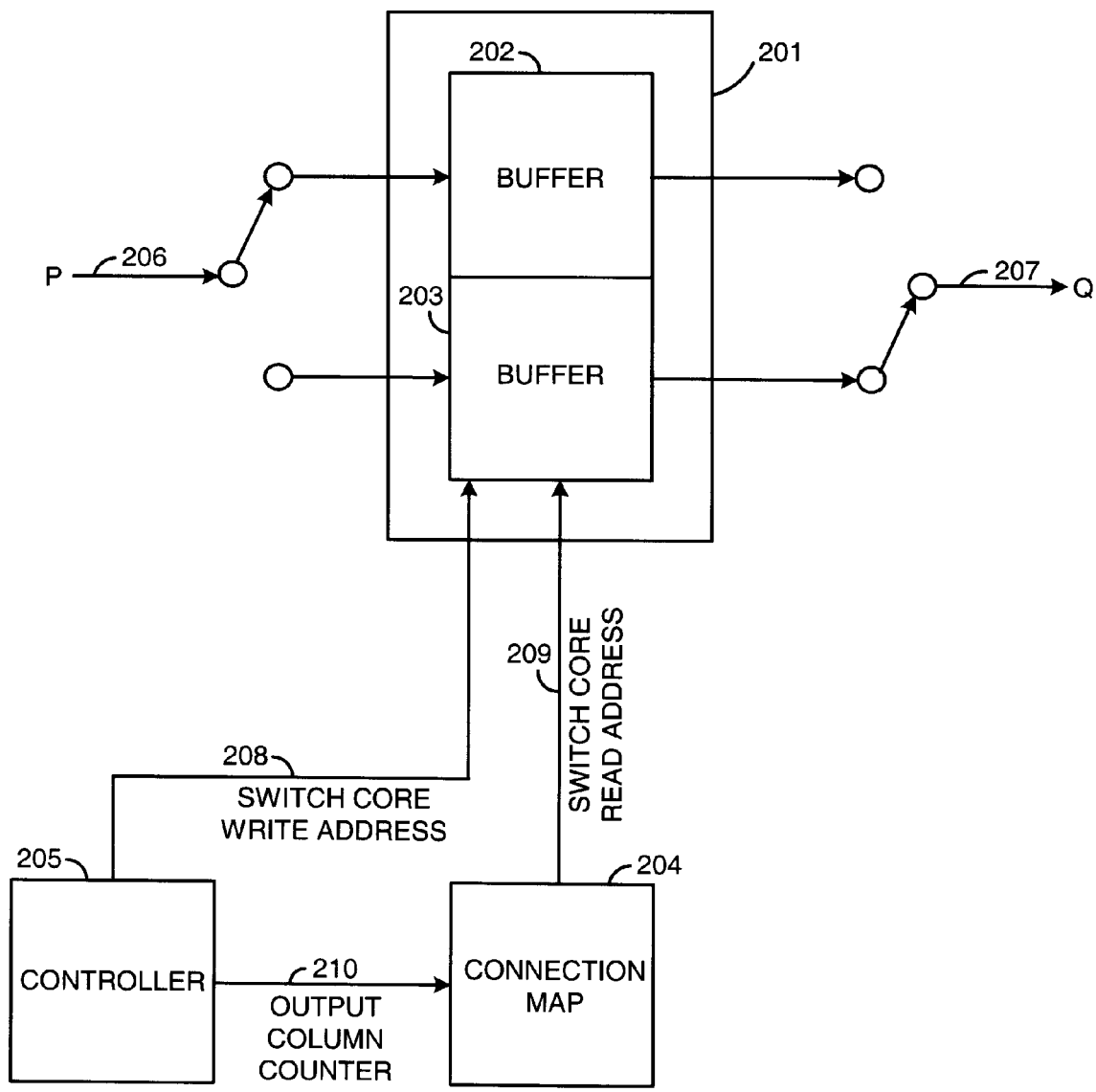
FIG. 2 is a diagram illustrating an exemplary tributary time-space switch according to the prior art.
Figure 3:
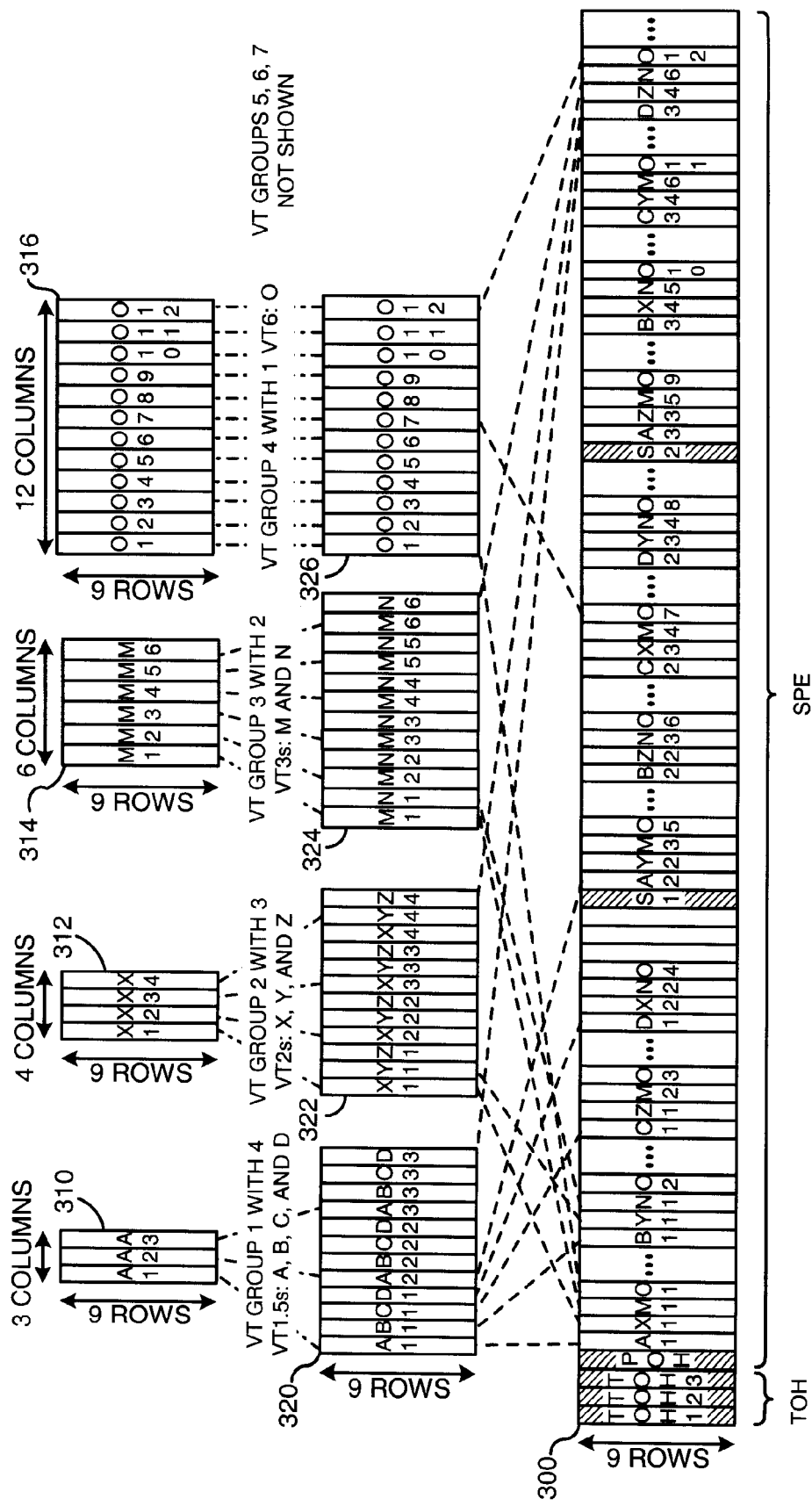
FIG. 3 is a diagram illustrating an example of a VT-structured STS-1 frame according to the SONET standard.

FIG. 3 is a diagram illustrating an example of a VT-structured STS-1 frame according to the SONET standard. The first three columns in the 90-column STS-1 frame 300 are the transport overhead TOH columns. The fourth column is the path overhead POH column, which signals the start of the synchronous payload envelope SPE. In particular, the path overhead POH column may be located in any position from column 4 to column 90. When the path overhead POH is located after column 4, the synchronous payload envelope SPE spans across two frame payloads. However, the exact location of the path overhead POH is immaterial as long as it is the same among all of the frames. Column aligners, such as those known to those skilled in the art, may be used to align the path overhead columns, and thus the synchronous payload envelopes, of the respective frames to the same column position.

Within the synchronous payload envelope SPE, the columns of the virtual tributaries are interleaved in time in a predetermined manner that maintains their temporal ordering. FIG. 3 illustrates how virtual tributaries are arranged in a frame according to the SONET standard.

There are four types of virtual tributaries defined for SONET, referred to as VT1.5, VT2, VT3, and VT6, respectively. In particular, a VT1.5 tributary 310 has a size including 9 rows of 3 byte columns A1, A2, A3, resulting in a frame rate of 1.728 Mbps. A VT2 tributary 312 having a frame rate of 2.304 Mbps includes 9 rows of 4 byte columns X1, ..., X4. A VT3 tributary 314 having a frame rate of 3.456 Mbps includes 9 rows of 6 byte columns M1, ..., M6. A VT6 tributary 316 having a frame rate of 6.912 Mbps and includes 9 rows of 12 byte columns, 01, ..., 012.

SONET virtual tributaries are organized into groups, referred to as VT groups. Each VT group occupies 12 columns of one or more virtual tributaries having the same tributary type. The possible combinations that a VT group can carry include four (4) VT1.5 tributaries as in group 320, three (3) VT2 tributaries as in group 322, two (2) VT3 tributaries, as in group 324, and one (1) VT6 tributary as in group 326.

Each VT group is arranged such that the temporal order of each tributary within the group is maintained. For example, in SONET, the twelve columns of the VT1.5 group 132 are arranged such that the first columns A1, B1, C1, and D1 of the four tributaries precede the second columns A2, B2, C2, and D2, which in turn precede the third columns, A3, B3, C3, and D3.

The temporal order of the individual tributaries within each group is further maintained in the column arrangement of the VT groups within the synchronous payload envelope of a frame. In particular, the STS-1 frame 300 can carry seven VT groups within the synchronous payload envelope SPE. The columns from each group are arranged in a fixed manner, such that the first column from each of the seven VT groups occupy the one of the first seven columns in the frame, the second columns occupy the next seven columns, and so forth.

A tributary time-space switch must not alter the temporal ordering of the columns within a tributary. For example, the switch core cannot time-switch column 5 that is occupied by the first column of VT Group 320 with column 34 that is occupied by the fifth column of VT Group 320 in either the same or another STS-1 frame. Regardless of whether VT Group 320 carries only VT1.5s, VT2s, VT3s, or a VT6, such time-switching reorders the columns temporally inside a particular tributary. In this example, column A2 would improperly precede column A1. The present invention takes advantage of this restriction to facilitate the memory reduction of the switch core.

Figure 4:
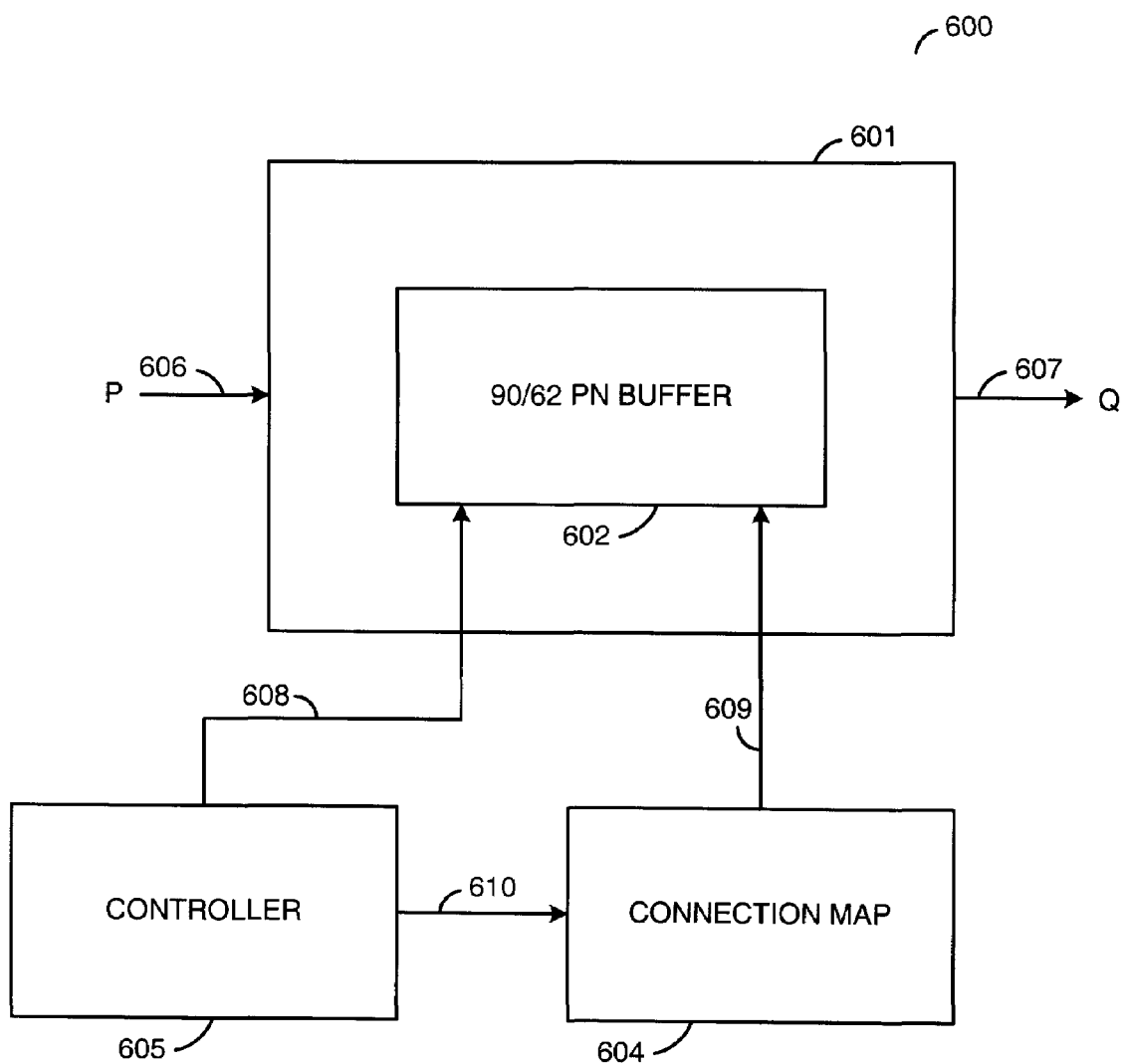
FIG. 4 is a diagram illustrating the tributary time-space switch according to one embodiment.

FIG. 4 is a diagram illustrating the tributary time-space switch according to one embodiment. The time-space switch 600 comprises a switch core 601, a connection map 604, and a controller 605. The switch core 601 comprises a single common buffer 602.

To achieve the time-space switching function, data from a frame row is written into the buffer 602 according to the write address 608 generated by the controller 605. As data from the frame row fill the buffer 602, data from the frame row is read in parallel according to read addresses 609 that are limited to certain portions of the buffer 602.

Each buffer portion depends on the location of the write address 608 and should not include the location referenced by the write address 608. In particular, the buffer portion contains a set of the input columns that are capable of being switched in time to a corresponding output column according to a communication protocol such as SONET. Preferably, the set of input columns are capable of maintaining the order of the input columns within each of the tributary payloads. The connection map 604 generates the read addresses 609 in response to being indexed by the output column counter 610 from the controller 605.

The switch core 601, which has P input ports and Q output ports, logically has one write port of 8P bits wide 606 and Q read ports of 8 bits wide 607. Physical implementation may limit the number of read ports of each switch core memory module to have fewer than Q read ports, say, K read ports, in which case M=[Q/K] copies of the K-read-port-one-write-port switch core modules are necessary to implement Q read ports for the switch core.

In one embodiment, the buffer 602 stores P rows of STS-N data, or 90PN bytes. Such a switch core requires P×N×M×90×8=720PNM bits. For instance, an 80 Gbps SONET tributary time-space switch having P=32 STS-48 (N=48) input ports requires 720PNM=1,105,920M bits for the switch core.

In another embodiment, the buffer 602 partially stores P rows of STS-N data using only 62PN bytes. Such a switch core requires P×N×M×62×8=496PNM bits. For instance, an 80 Gbps SONET tributary time-space switch having P=32 STS-48 (N=48) input ports requires 496PNM=761,856M bits for the switch core.

Figure 5:
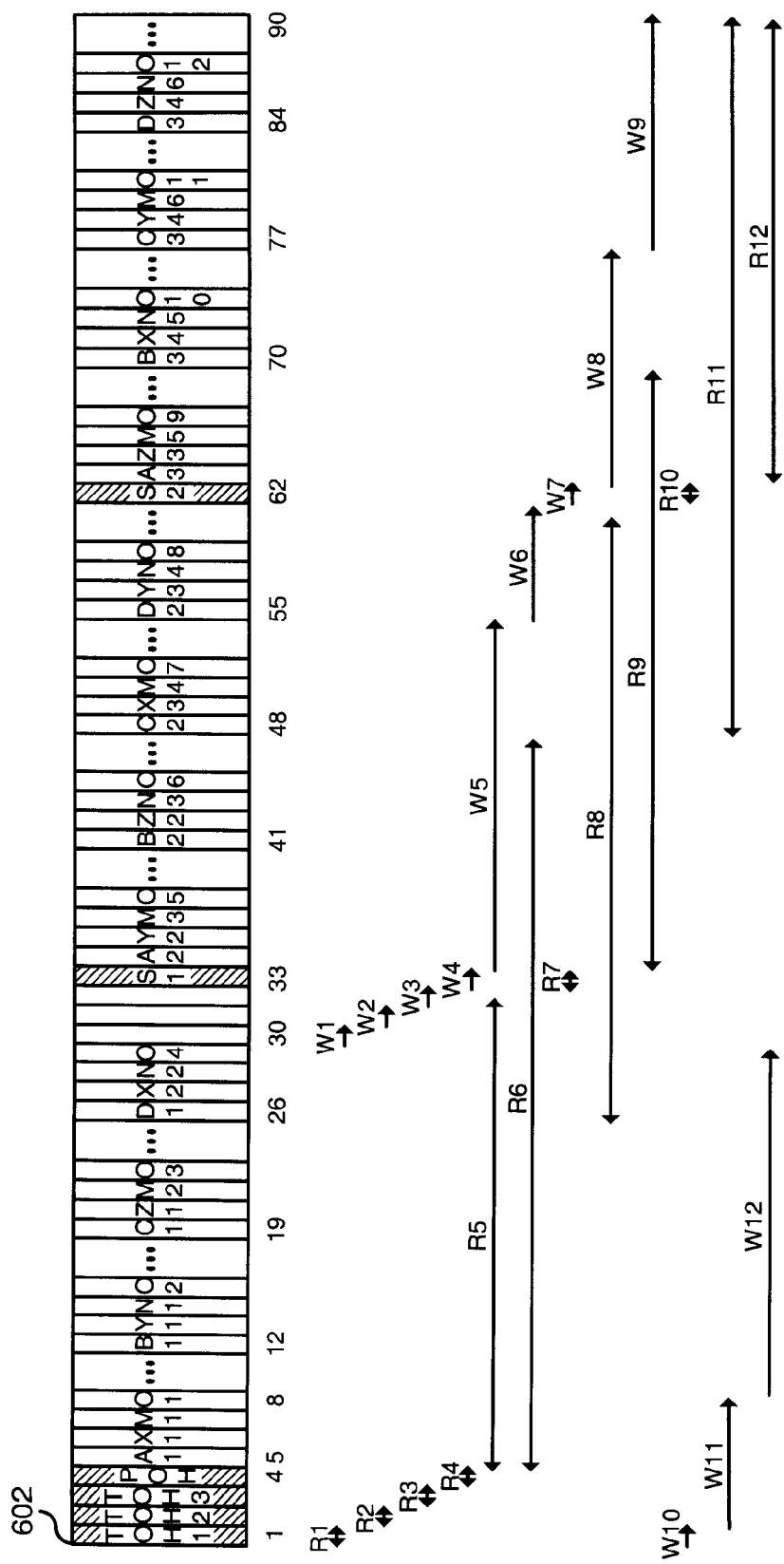
FIG. 5 is a diagram illustrating the memory access timing according to one embodiment.

To implement the switch core with the reduced memory requirements, memory accesses to the buffer are coordinated for reading and writing. FIG. 5 is a diagram illustrating the memory access timing according to one embodiment. In this embodiment, the switch core 601 requires P×N×M×90×8=720PNM bits, which is half as many as in the prior art. FIG. 5 decomposes these memory accesses into twelve phases to illustrate why double-buffering is unnecessary.

The buffer 602 in the switch core 601 is read and written simultaneously during each phase. Each box in FIG. 5 represents N consecutive bytes in a SONET STS-N frame 305 in a buffer 602. In particular, the boxes labeled '1', '2', and '3' represent one particular row of the 3N transport overhead TOH columns of an STS-N frame. The box labeled '4' is one row of the path overhead POH columns. The boxes labeled '33' and '62' are one row of the stuffed columns. For each phase p, FIG. 5 denotes the addresses being randomly read with a bidirectional arrow as 'Rp' and the addresses being sequentially written with a unidirectional arrow as 'Wp'. The span of the write arrow denotes the duration of a phase. For instance, 'W5' commences at the left edge of box '34' and terminates at the right edge of box '54' and so the duration of phase 5 is 21N bytes. In phase 5, 'R5' spans from box '5' to box '32' while 'W5' spans from '34' to '54' meaning that any bytes from column 5N to 33N-1 are being randomly read while columns 34N to 44N-1 are being sequentially written.

Each phase involves a particular set of bytes in the buffer 602 that are available for read and write. The particular set includes bytes that prevent the read and the write pointers from overlapping while minimizing the size of the switch core buffer. As illustrated in FIG. 5, the write pointer is 29N columns (bytes) ahead of the output column. For instance, when the controller 605 generates the first output column, i.e. the first TOH column, it can time-and space-switch data from any one of the first N input TOH columns from any of the P STS-N streams while the write pointer is at column 30N. In fact, it can read data from the same set of input columns (labeled 'R1' in FIG. 5) when the write pointer is at column 30N+1, 30N+2, ..., 31 N−1. A similar pattern applies to the second through the fourth phases.

At the beginning of phase 5, the controller 605 generates the first tributary column (output column 5N), which can be time-switched from any input column ranging from column 5N to column 33N-1. An example in which input column 33N-1 gets time-switched to output column 5N is when the fourth VT1.5 tributary in seventh VT Group in the last STS-1 frame is time-switched to the first VT1.5 tributary in the first VT Group in the first STS-1 frame. No other legal connection results in a wider span than 'R5' during this and the following 21N-1 output columns. Therefore, FIG. 5 has 'R5' spanning from column 5N to column 33N-1 while 'W5' ranges from 34N to 55N-1.

At the beginning of phase 6, the controller 605 generates output column 26N. The span 'R5' is no longer valid because output column 26N can connect to input column 48N-1. For example, the last input VT2 tributary in the seventh VT Group in the last STS-1 frame can be time-switched to the first output VT2 tributary in first VT Group in the first STS-1 frame. Meanwhile, the range 'R5' must be a subset of 'R6' for 7N columns because the first input VT1.5 tributary in the first VT Group in the first STS-1 frame to the last input VT1.5 tributary in the seventh VT Group in the last STS-1 frame can still be connected to the output. No legal connections require the read range to go beyond input column 48N-1 and therefore 'R6' spans from input column 5N to input 48N-1.

The foregoing analysis can be applied to the remaining phases until phase 12. After phase 12, phase 1 applies and the switch core read/write cycle starts anew. The following table describes all twelve phases as to where the write pointers and read pointers are in the switch core. Because the read and write pointers never overlap, a buffer of P×N×M×90×8=720PNM bits is sufficient for time- and space-switching multicast tributary traffic in an unrestricted non-blocking fashion.

| Phase | R/W | Columns Read or Written | Remarks |
|---|---|---|---|
| 1 | Read | 1-2N-1 | First N columns of TOH. |
|   | Write | 30N-31N-1 | Write N columns. |
| 2 | Read | 2N-3N-1 | Second N columns of TOH. |
|   | Write | 31N-32N-1 | Write N columns. |
| 3 | Read | 3N-4N-1 | Third N columns. |
|   | Write | 32N-33N-1 | Write N columns. |
| 4 | Read | 4N-5N-1 | N columns of POH (or an equivalent of one column of POH in an STS-Nc frame with N-1 stuffed columns). |
|   | Write | 33N-34N-1 | Write N columns. |
| 5 | Read | 5N-33N-1 | Can read the first columns of any VT1.5s and VT2s, up to the second column of any VT3s, and up to the third column of any VT6s. |
|   | Write | 34N-55N-1 | Write 21N columns |
| 6 | Read | 5N-48N-1 | Can read the first column of any VT1.5s, the second column of any VT2s, up to the second column of any VT3s, and up to the fourth column of any VT6s. |
|   | Write | 55N-62N-1 | Write 7N columns. |
| 7 | Read | 33N-34N-1 | Read N stuffed columns. |
|   | Write | 62N-63N-1 | Write N columns. |
| 8 | Read | 26N-62N-1 | Can read the second column from any VT1.5s and VT2s, the third column of any VT3s, and the fourth and the fifth column of any VT6s. |
|   | Write | 63N-77N-1 | Write 14N columns. |
| 9 | Read | 34N-70N-1 | Can read the second column from any VT1.5s, the third column of any VT2s, the fourth column of any VT3s, and the seventh and the eighth columns of any VT6s. |
|   | Write | 77N-91N-1 | Write 14N columns. |
| 10 | Read | 62N-63N-1 | Read N stuffed columns |
|    | Write | 1-2N-1 | Write N columns from the next row. |
| 11 | Read | 48N-91N-1 | Can read the third column from any VT1.5s, the third column from any VT2s, the fifth column from any TV3s, and the ninth column from any VT6s. |
|    | Write | 2N-9N-1 | Write 7N columns. |
| 12 | Read | 63N-91N-1 | Can read the third column from any VT1.5s, the fourth column from any VT2s, the fifth and sixth columns from any VT3s, and the tenth to twelfth columns from any VT6s. |
|    | Write | 9N-30N-1 | Write 21N columns. |

Each of these buffer portions can also be an arbitrary set of buffer locations such that during any time slot the read controller can select any byte from the set to correctly switch the byte to the output and the buffer write pointer does not point to any buffer location in the set.

Figure 6:
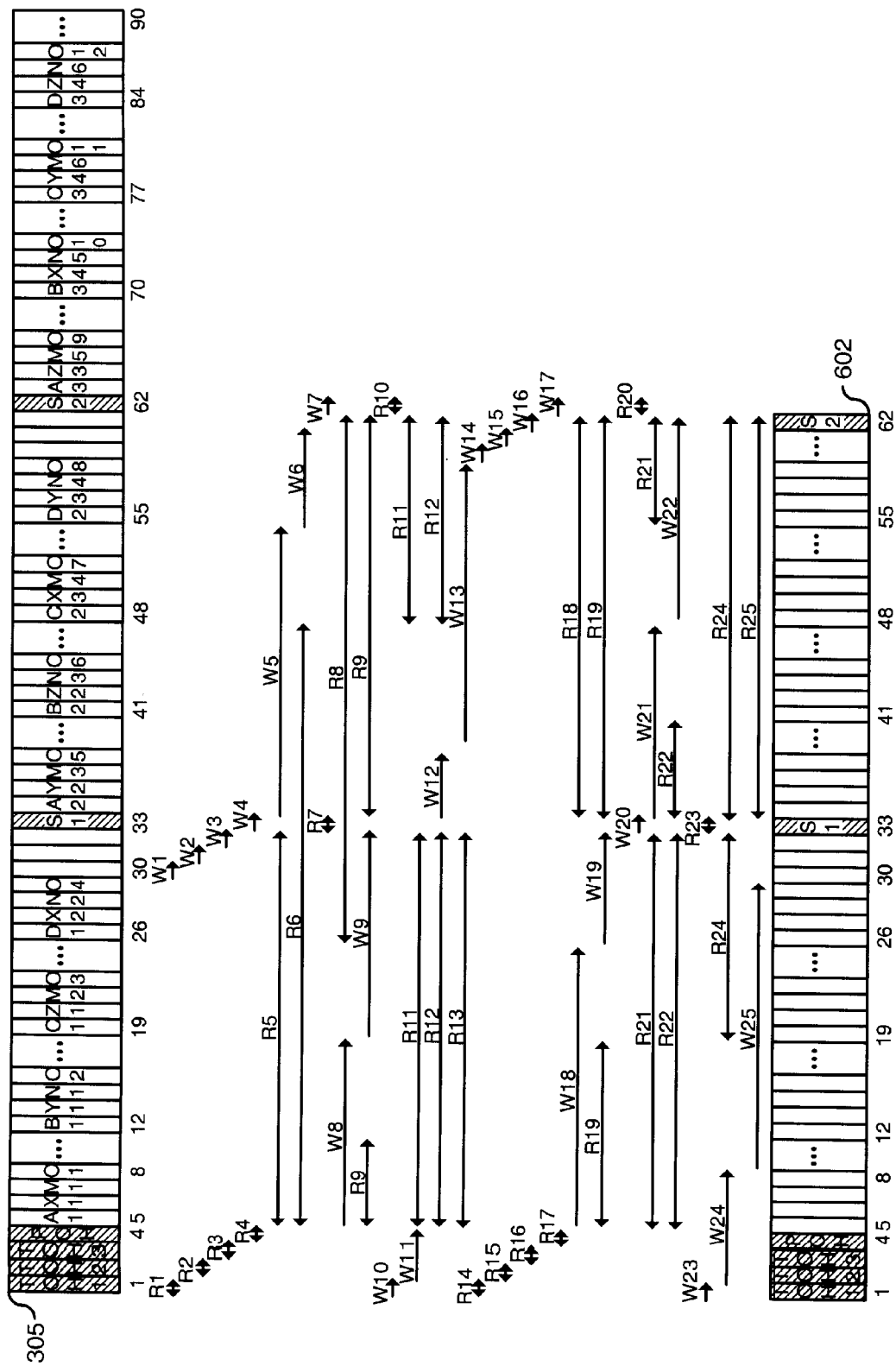
FIG. 6 is a diagram illustrating the memory access timing according to another embodiment.

A further switch core memory optimization is possible by eliminating the last 28N bytes from the buffer. This switch core therefore requires P×N×M×62×8=496PNM bits. With this switch core memory design, the controller 605 must keep track of which row of data it is reading and writing. For instance, data from columns 63N to 91N-1 are folded in buffer columns 5N to 33N-1 every other row. FIG. 6 is a diagram illustrating the memory access timing according to another embodiment. In this embodiment, the switch core 601 requires a buffer 602 having P×N×M×62×8=496PNM bits, providing a further reduction in the switch core memory requirements as in the prior art. The following table describes the 25 phases of switch core accesses.

| Phase | R/W | Columns Read or Written | Remarks |
|---|---|---|---|
| 1 | Read | 1-2N-1 | First N columns of TOH. |
|   | Write | 30N-31N-1 | Write N columns. |
| 2 | Read | 2N-3N-1 | Second N columns of TOH. |
|   | Write | 31N-32N-1 | Write N columns. |
| 3 | Read | 3N-4N-1 | Third N columns of TOH. |
|   | Write | 32N-33N-1 | Write N columns. |
| 4 | Read | 4N-5N-1 | N columns of POH (or an equivalent of one column of POH in an STS-Nc frame with N-1 stuffed columns). |
|   | Write | 33N-34N-1 | Write N columns. |
| 5 | Read | 5N-33N-1 | Can read the first |

-continued

| Phase | R/W | Columns Read or Written | Remarks |
|---|---|---|---|
| | | | columns of any VT1.5s and VT2s, up to the second column of any VT3s, and up to the third column of any VT6s. |
| | Write | 34N-55N-1 | Write 21N columns. |
| 6 | Read | 5N-48N-1 | Can read the first column of any VT1.5s, the second column of any VT2s, up to the second column of any VT3s, and up to the fourth column of any VT6s. |
| | Write | 55N-62N-1 | Write 7N columns. |
| 7 | Read | 33N-34N-1 | Read N stuffed columns. |
| | Write | 62N-63N-1 | Write N columns. |
| 8 | Read | 26N-62N-1 | Can read the second column from any VT1.5s and VT2s, the third column of any VT3s, and the fourth and the fifth column of any VT6s. |
| | Write | 5N-19N-1 | Write 14N columns. Columns 63N-77N-1 are now aliased into these columns. |
| 9 | Read | 34N-62N-1 and 5N-12N-1 | Can read the second column from any VT1.5s, the third column of any VT2s, the fourth column of any VT3s, and the seventh and the eighth columns of any VT6s. |
| | Write | 19N-33N-1 | Write 14N columns. |
| 10 | Read | 62N-63N-1 | Read N stuffed columns. |
| | Write | 1-2N-1 | Write N columns from the next row. |
| 11 | Read | 48N-62N-1 and 5N-33N-1 | Can read the third column from any VT1.5s, the third column from any VT2s, the fifth column from any VT3s, and the ninth column from any VT6s. |
| | Write | 2N-5N-1 | Write 3N columns. |
| 12 | Read | 48N-62N-1 and 5N-33N-1 | Can read the third column from any VT1.5s, the third column from any VT2s, the fifth column from any VT3s, and the ninth column from any VT6s. |
| | Write | 34N-38N-1 | Write 4N columns. |
| 13 | Read | 5N-33N-1 | Can read the third column from any VT1.5s, the fourth column from any VT2s, the fifth and sixth columns from any VT3s, and the tenth to twelfth columns from any VT6s. |
| | Write | 38N-59N-1 | Write 21N columns. |
| 14 | Read | 1-2N-1 | First N columns of TOH. |
| | Write | 59N-60N-1 | Write N columns. |
| 15 | Read | 2N-3N-1 | Second N columns of TOH. |
| | Write | 60N-61N-1 | Write N columns. |
| 16 | Read | 3N-4N-1 | Third N columns of TOH. |
| | Write | 61N-62N-1 | Write N columns. |
| 17 | Read | 4N-5N-1 | N columns of POH (or an equivalent of one column of POH in an STS-N c frame with N-1 stuffed columns). |
| | Write | 62N-63N-1 | Write N columns. |
| 18 | Read | 34N-62N-1 | Can read the first columns of any VT1.5s and VT2s, up to the second column of any VT3s, and up to the third column of any VT6s. |
| | Write | 5N-26N-1 | Write 21N columns. |
| 19 | Read | 5N-19N-1 and 34N-62N-1 | Can read the first column of any VT1.5s, the second column of any VT2s, up to the second column of any VT3s, and up to the fourth column of any VT6s. |
| | Write | 26N-33N-1 | Write 7N columns. |
| 20 | Read | 62N-63N-1 | Read N stuffed columns. |
| | Write | 33N-34N-1 | Write N columns. |
| 21 | Read | 5N-33N-1 and 55N-62N-1 | Can read the second column from any VT1.5s and VT2s, the third column of any VT3s, and the fourth and fifth column of any VT6s. |
| | Write | 34N-48N-1 | Write 14N columns. |
| 22 | Read | 5N-33N-1 and 34N-41N-1 | Can read the second column from any VT1.5s, the third column of any VT2s, the fourth column of any VT3s, and the seventh and eighth columns of any VT6s. |
| | Write | 48N-62N-1 | Write 14N columns. |
| 23 | Read | 33N-34N-1 | Read N stuffed columns. |
| | Write | 1-2N-1 | Write N columns from the next row. |
| 24 | Read | 19N-33N-1 and 34N-62-1 | Can read the third column from any VT1.5s, the third column from any VT2s, the fifth column from any VT3s, and the ninth column from any VT6s. |
| | Write | 2N-9N-1 | Write 7N columns. |
| 25 | Read | 34N-62N-1 | Can read the third column from any VT1.5s, the fourth column from any VT2s, the fifth and sixth columns from any VT3s, and the tenth to twelfth columns from any VT6s. |
| | Write | 9N-30N-1 | Write 21N columns. |

Each of these buffer portions can also be an arbitrary set of buffer locations such that during any time slot the read controller can select any byte from the set to correctly switch the byte to the output and the buffer write pointer does not point to any buffer location in the set.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of switching, comprising:
   receiving an input data stream carrying plural tributary payloads from an external input link, each of the plural tributary payloads switchable in space and time;
   writing input columns of the input data stream to a common buffer according to a write pointer; and
   in parallel with writing, reading from the common buffer to output columns of an output data stream according to a read pointer, the read pointer selecting, for each of the output columns, an input column from a limited portion of the common buffer that contains a set of the input columns that are switchable in time to the corresponding output column according to a communication protocol and maintaining an order of input columns within each of the plural tributary payloads.

2. The method of claim 1 wherein the limited portion of the buffer depends on a corresponding location of the write pointer in the buffer, for each output column the corresponding location of the write pointer and the limited portion containing the set of input columns for reading being mutually exclusive.

3. The method of claim 1 wherein each of the plural tributary payloads is characterized by an arbitrary type.

4. The method of claim 3 wherein each of the plural tributary payloads is characterized by a type selected from the group consisting of VT1.5, VT2, VT3 and VT6.

5. The method of claim 1 wherein each of the plural tributary payloads is characterized by a same type.

6. The method of claim 1 wherein the communication protocol is SONET.

7. The method of claim 1 wherein each of the plural tributary payloads comprise an ordered set of input columns that are interleaved within a payload of the input data stream.

8. The method of claim 1 wherein the input data stream is a frame having columns and rows and the common buffer having a length substantially equal to a frame row.

9. The method of claim 8 further comprising:
   writing the input columns of the frame row into the common buffer sequentially from a beginning location to an end location of the common buffer according to the write pointer; and
   in parallel with writing, reading the input columns from the common buffer to the output columns of the output data stream, the read pointer selecting, for each of the output columns, an input column from a limited portion of the common buffer that contains a set of the input columns that are switchable in time to the corresponding output column and maintaining the order of the input columns within each of the plural tributary payloads, the limited portion being a continuous range of buffer locations that depends on a corresponding location of the write pointer in the common buffer.

10. The method of claim 8 wherein the frame is an STS-N frame and the common buffer has a length substantially equal to 90N bytes.

11. The method of claim 1 wherein the input data stream is a frame having columns and rows and the common buffer having a length less than a frame row.

12. The method of claim 11 further comprising:
   writing a first set of the input columns of the frame row into the common buffer sequentially from a beginning location to an end location of the buffer; and
   further writing a second set of the input columns of the frame row sequentially from an intermediate location to an end location of the buffer.

13. The method of claim 11 wherein the frame is an STS-N frame and the common buffer has a length substantially equal to 62N bytes.

14. A switch comprising:
   a plurality of inputs and a plurality of outputs;
   each of the plurality of inputs receiving an input data stream carrying plural tributary payloads from an external input link, each of the plural tributary payloads switchable in space and time;
   a write controller causing input columns of the input data stream to be written to a common buffer according to a write pointer; and
   a read controller, in parallel with the write controller, causing the input columns to be read from the common buffer to output columns of an output data stream according to a read pointer, the read pointer selecting, for each of the output columns, an input column from a limited portion of the common buffer that contains a set of the input columns that are switchable in time to the corresponding output column according to a communication protocol and maintaining an order of input columns within each of the plural tributary payloads.

15. The switch of claim 14 wherein the limited portion of the common buffer depends on a corresponding location of the write pointer in the common buffer, for each output column the corresponding location of the write pointer and the limited portion containing the set of input columns for reading being mutually exclusive.

16. The switch of claim 14 wherein each of the plural tributary payloads is characterized by an arbitrary type.

17. The switch of claim 16 wherein each of the plural tributary payloads is characterized by a type selected from the group consisting of VT1.5, VT2, VT3 and VT6.

18. The switch of claim 14 wherein each of the plural tributary payloads is characterized by a same type.

19. The switch of claim 14 wherein the communication protocol is SONET.

20. The switch of claim 14 wherein:
   each of the plural tributary payloads comprise an ordered set of input columns that are interleaved within a payload of the input data stream.

21. The switch of claim 14 wherein the input data stream is a frame having columns and rows and the common buffer having a length substantially equal to a frame row.

22. The switch of claim 21 wherein:
   the write controller causes the input columns of the frame row to be written into the common buffer sequentially from a beginning location to an end location of the buffer according to the write pointer;
   the read controller, in parallel with the write controller, causes the input columns from the common buffer to be read to the output columns of the output data stream, the read pointer selecting, for each of the output columns, an input column from a limited portion of the common buffer that contains a set of the input columns that are switchable in time to the corresponding output column and maintaining the order of the input columns within each of the plural tributary payloads; and
   the limited portion is a continuous range of buffer locations that depends on a corresponding location of the write pointer in the common buffer.

23. The switch of claim 21 wherein the frame is an STS-N frame and the common buffer has a length substantially equal to 90N bytes.

24. The switch of claim 14 wherein the input data stream is a frame having columns and rows and the common buffer having a length less than a frame row.

25. The switch of claim 24 wherein:
   the write controller causes a first set of the input columns of the frame row to be written into the common buffer sequentially from a beginning location to an end location of the buffer; and
   the write controller further causes a second set of the input columns of the frame row to be written sequentially from an intermediate location to an end location of the common buffer.

26. The switch of claim 24 wherein the frame is an STS-N frame and the common buffer has a length substantially equal to 62N bytes.

27. A switch comprising:
a plurality of inputs and a plurality of outputs;
each of the plurality of inputs receiving an input data stream carrying plural tributary payloads from an external input link, each of the plural tributary payloads switchable in space and time;
a writing means for writing input columns of the input data stream to a common buffer according to a write pointer; and
a read means for reading the input columns from common buffer to output columns of an output data stream according to a read pointer in parallel with the writing means, the read pointer selecting, for each of the output columns, an input column from a limited portion of the buffer that contains a set of the input columns that are switchable in time to the corresponding output column according to a communication protocol and maintaining an order of input columns within each of the plural tributary payloads.

28. The method of claim 12 further comprising:
in parallel with writing the first set and the second set of the input columns, reading the input columns from the common buffer to the output columns of the output data stream, the read pointer selecting, for each of the output columns, an input column from a limited portion of the common buffer that contains a set of the input columns that are switchable in time to the corresponding output column and maintaining the order of the input columns within each of the plural tributary payloads, the limited portion including buffer locations that depend on a corresponding location of the write pointer in the common buffer and whether the first set or the second set of the input data units is being written.

29. The switch of claim 25 wherein:
the read controller, in parallel with the write controller, causes the input columns from the common buffer to be read to the output columns of the output data stream, the read pointer selecting, for each of the output columns, an input column from a limited portion of the common buffer that contains a set of the input columns that are switchable in time to the corresponding output column and maintaining the order of the input columns within each of the plural tributary payloads; and
the limited portion includes buffer locations that depend on a corresponding location of the write pointer in the common buffer and whether the first set or the second set of the input data units is being written.

* * * * *